United States Patent
Jilavi et al.

(10) Patent No.: US 8,133,573 B2
(45) Date of Patent: Mar. 13, 2012

(54) SCRATCH-RESISTANT OPTICAL MULTI-LAYER SYSTEM APPLIED TO A CRYSTALLINE SUBSTRATE

(75) Inventors: Mohammad Jilavi, Kirkel (DE); Martin Mennig, Quierschied (DE); Peter William Oliveira, Saarbruecken (DE); Helmut Schmidt, Saarbruecken-Guedingen (DE)

(73) Assignee: Leibniz-Institut Fuer Neue Materialien Gemeinnuetzige GmbH, Saarbruecken (DE)

( * ) Notice: Subject to any disclaimer, the term of this patent is extended or adjusted under 35 U.S.C. 154(b) by 725 days.

(21) Appl. No.: 10/591,598

(22) PCT Filed: Mar. 16, 2005

(86) PCT No.: PCT/EP2005/002795
§ 371 (c)(1),
(2), (4) Date: Nov. 30, 2006

(87) PCT Pub. No.: WO2005/091021
PCT Pub. Date: Sep. 29, 2005

(65) Prior Publication Data
US 2007/0196640 A1 Aug. 23, 2007

(30) Foreign Application Priority Data
Mar. 17, 2004 (DE) .......................... 10 2004 012 977

(51) Int. Cl.
*B32B 5/16* (2006.01)
*G02B 1/10* (2006.01)
(52) U.S. Cl. ........ 428/174; 428/323; 428/328; 428/329; 359/580; 359/586
(58) Field of Classification Search .................. 428/156, 428/174, 323, 328, 329, 330, 331; 359/580, 359/581, 586, 588; 427/162, 164
See application file for complete search history.

(56) References Cited

U.S. PATENT DOCUMENTS
3,493,289 A * 2/1970 Edwards ........................ 359/359
3,698,946 A * 10/1972 Kaspaul et al. ............... 428/432
(Continued)

FOREIGN PATENT DOCUMENTS
DE 1941191 1/1971
(Continued)

OTHER PUBLICATIONS
Lewis, Richard J., Sr. (2002). Hawley's Condensed Chemical Dictionary (14th Edition) . . . John Wiley & Sons; Interactive Table-Chemical Properties of Materials. Online version available at: http://www.knovel.com/web/portal/browse/display?_EXT_KNOVEL_DISPLAY_bookid=704&VerticalID=0.*
(Continued)

Primary Examiner — Catherine A Simone
(74) Attorney, Agent, or Firm — Abel Law Group, LLP

(57) ABSTRACT

A process for producing a crystalline substrate with an optical multi-layer system thereon and the crystalline substrate obtainable thereby. The process comprises the successive application of at least two free-flowing compositions which comprise nanoscale inorganic solid particles comprising at least one of a polymerizable and a polycondensable organic group to a surface of the crystalline substrate and the polymerization and/or polycondensation of the organic groups of the solid particles to form organically crosslinked layers on the substrate and a single-stage thermal consolidation of these layers with a burnout of organic constituents thereof. The at least two compositions give rise to layers with different refractive indices.

30 Claims, 1 Drawing Sheet

U.S. PATENT DOCUMENTS

| | | | |
|---|---|---|---|
| 3,759,683 | A | 9/1973 | Dislich et al. |
| 3,847,583 | A | 11/1974 | Dislich et al. |
| 4,188,444 | A * | 2/1980 | Landau .................. 428/428 |
| 4,696,536 | A * | 9/1987 | Albares et al. .................. 385/14 |
| 5,858,526 | A | 1/1999 | Floch et al. |
| 6,091,195 | A * | 7/2000 | Forrest et al. .................. 313/504 |
| 6,236,493 | B1 | 5/2001 | Schmidt et al. |
| 6,329,058 | B1 * | 12/2001 | Arney et al. .................. 428/403 |
| 6,455,103 | B1 | 9/2002 | Mennig et al. |
| 6,791,905 | B1 | 9/2004 | Sekiguchi |
| 2002/0017452 | A1 * | 2/2002 | Zimmermann et al. ... 204/192.1 |

FOREIGN PATENT DOCUMENTS

| | | |
|---|---|---|
| DE | 19613645 | 10/1997 |
| DE | 19823732 | 12/1999 |
| JP | 2000-285681 A | 10/2000 |
| JP | 2000-314809 A | 11/2000 |
| JP | 2002-516246 | 6/2002 |
| JP | 2002-516249 A | 6/2002 |
| JP | 2004-4795 A | 1/2004 |
| WO | 99/61370 A1 | 12/1999 |
| WO | 99/61383 | 12/1999 |
| WO | 00/31596 A1 | 6/2000 |

OTHER PUBLICATIONS

Schmidt et al., "Optical Materials by a Modified Sol-Gel Nanoparticle Process", Proceedings of SPIE, vol. 3943, 2000, pp. 74-84.

Mennig et al., "Interference Coatings on Glass Based on Photopolymerizable Nanomer Material", Thin Solid Films, vol. 351, 1999, pp. 99-102.

Mennig et al., "Sol-Gel NIR-reflective Multilayer Coatings on Glass through UV-polymerizable Ceramic Nanoparticles", Mat. Res. Soc. Symp. Proc., vol. 576, 1999, pp. 415-421.

Oliveira et al. "Generation of Wet-chemical AR-coatings on Plastic Substrates by Use of Polymerizable Nanoparticles", SPIE, vol. 3136, 1997, pp. 452-461.

English language machine translation of JP 2000-314809 A.
English language machine translation of JP 2000-285681 A.
English language machine translation of JP 2004-4795 A.

* cited by examiner

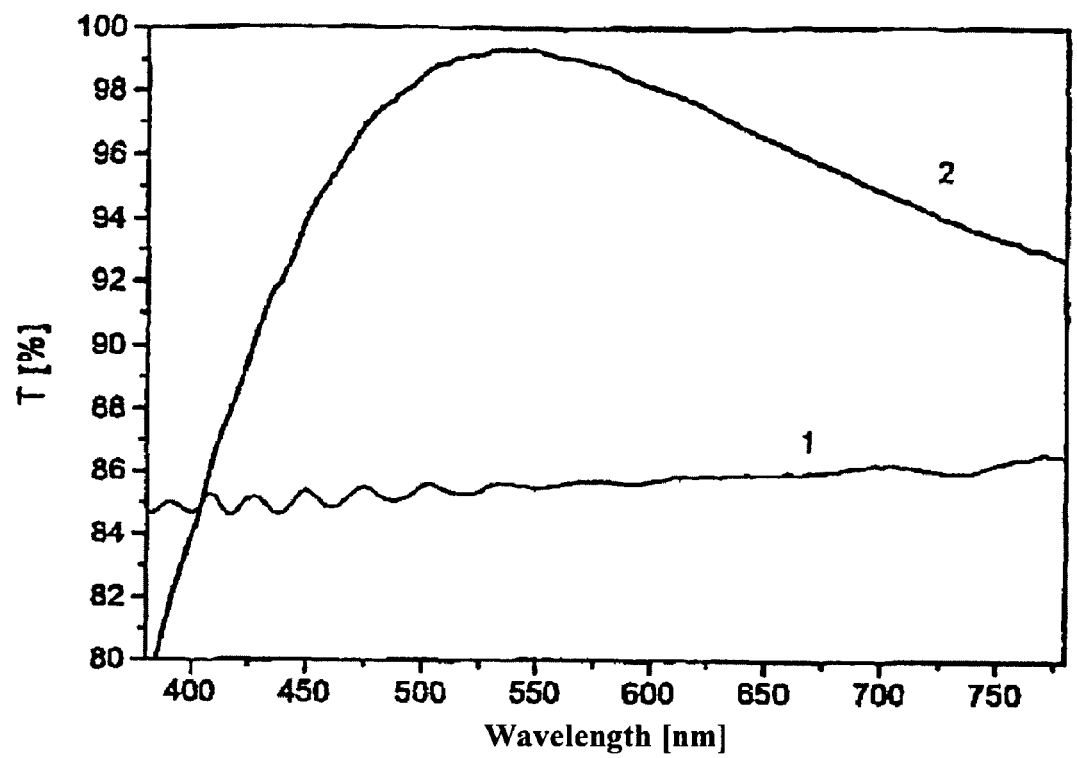

US 8,133,573 B2

SCRATCH-RESISTANT OPTICAL MULTI-LAYER SYSTEM APPLIED TO A CRYSTALLINE SUBSTRATE

CROSS-REFERENCE TO RELATED APPLICATIONS

The present application is a U.S. National Stage of International Application No. PCT/EP2005/002795, filed Mar. 16, 2005, which claims priority of German Patent Application No. 10 2004 012 977.0, filed Mar. 17, 2004.

BACKGROUND OF THE INVENTION

1. Field of the Invention

The invention relates to an optical multi-layer system on a crystalline substrate, which is obtainable by a one-stage baking process ("stack cure"), to a process for producing the optical multi-layer system and to its use.

2. Discussion of Background Information

Apart from by means of sputtering and vapor deposition processes, multi-layer systems with optical properties can be produced on glass by means of the so-called sol-gel process; see, for example, Dislich et al. DE 1941191. The principle of this production method is that the appropriate glass substrate is coated with a sol by a dipping process and the layer is dried and baked at relatively high temperatures in order to achieve consolidation. The pre-drying at relatively high temperatures is necessary in order to impart to the first layer sufficient chemical stability, since it is otherwise dissolved partly or fully by the new coating sol. The process is complicated, since a thermal treatment at temperatures of 400-500° C. is required after each layer application. This makes the production of multi-layer systems, as required in specific optical applications (broadband antireflection coating, cold light mirror, etc.), exceptionally labor-intensive and costly.

P. W. Oliveira, H. Krug, A. Frantzen, M. Mennig, H. Schmidt describe, in SPIE, vol. 3136, pages 452-461, a process for producing optical multi-layer systems on plastics substrates using nanoscale particles surface-modified with 3-glycidyloxypropyltrimethoxysilane in an organically modified inorganic matrix. Photolytic curing is effected. A thermal treatment is effected up to a maximum of 80° C. This allows interference layer systems to be produced on plastics substrates.

WO 99/61383 describes a process for producing optical multi-layer systems on glass substrates, in which at least two coating compositions which comprise nanoscale inorganic solid particles having polymerizable and/or polycondensable organic surface groups are applied to a glass substrate and baked in one stage.

The wet-chemical optical multi-layer systems obtained in accordance with the prior art are based on a glass or plastics substrate.

SUMMARY OF THE INVENTION

The present invention provides a process for the production of a crystalline substrate with an optical multi-layer system thereon. The process comprises:

(a) the application of a first free-flowing composition which comprises nanoscale inorganic solid particles comprising a polymerizable and/or polycondensable organic group to at least one surface of the crystalline substrate;

(b) the polymerization and/or polycondensation of the organic groups of the solid particles to form a first organically crosslinked layer on the at least one surface;

(c) the application of a second free-flowing composition which comprises nanoscale inorganic solid particles comprising a polymerizable and/or polycondensable organic group to the organically crosslinked layer of (b), the second composition giving rise to a different refractive index than the first composition;

(d) the polymerization and/or polycondensation of the organic groups of the solid particles of the applied second composition to form a second organically crosslinked layer on the first organically crosslinked layer;

(e) optionally, the application of a further free-flowing composition which comprises nanoscale inorganic solid particles comprising a polymerizable and/or polycondensable organic group to the organically crosslinked layer of (d) and the polymerization and/or polycondensation of the organic groups of the solid particles of the further composition to form a further organically crosslinked layer on the second organically crosslinked layer;

(f) optionally, repeating (e) one or more times to form one or more further organically crosslinked layers; and (g) a single-stage thermal consolidation of the organically crosslinked layers present and the burnout of organic constituents thereof;

with the proviso that for the uppermost layer, (1) the polymerization and/or polycondensation of the organic groups of the solid particles of the applied composition to form an organically crosslinked layer may optionally be effected concurrently with (g) or (2) alternatively and optionally, the nanoscale inorganic solid particles do not comprise a polymerizable or polycondensable organic group, so that, in this case, for the uppermost layer, a polymerization or polycondensation of groups of the solid particles with formation of organic crosslinking does not take place before or during (g).

In one aspect of the process, one or more organically crosslinked layers may be formed at a temperature of up to about 150° C., for example, at a temperature of up to about 130° C. In another aspect, they may be formed by photochemical polymerization and/or polycondensation.

In another aspect of the process of the present invention, (g) may be carried out at a temperature of from 400° C. to 800° C., for example, at a temperature of from 400° C. to 600° C. In yet another aspect, (g) may be carried out in such a way that the heating of the crosslinked layer(s) is effected from outside inward in a direction toward the crystalline substrate. In a still further aspect, the heating rate of the crosslinked layer(s) in (g) may be at least 100° K/min.

In another aspect of the process of the present invention, the nanoscale particles may comprise one or more compounds selected from semimetal and metal compounds. For example, the nanoscale particles may comprise one or more compounds selected from oxides, sulfides, selenides and tellurides of semimetals and metals such as, e.g., one or more compounds selected from $SiO_2$, $TiO_2$, $ZrO_2$, ZnO, $Ta_2O_5$, $SnO_2$ and $Al_2O_3$.

In another aspect of the process, the polymerizable or polycondensable organic groups may comprise organic radicals which comprise a (meth)acryloyl group, a vinyl group, an allyl group and/or an epoxy group.

In a still further aspect, the solid particles may have been produced by surface modification of nanoscale solid particles to provide them with polymerizable or polycondensable organic groups, or the solid particles may have been produced from at least one compound that comprises a polymerizable and/or polycondensable group. Still further, the inorganic solid particles may have been produced by the sol-gel process.

In yet another aspect, at least one of the first and second compositions may have a pH of from 3 to 8.

The present invention also provides a crystalline substrate with an optical multi-layer system thereon, which substrate is obtainable by the process set forth above, including the various aspects thereof.

In one aspect, the crystalline substrate may comprise one or more of silicon, lithium niobate, lithium tantalate, quartz, sapphire, PbS and selenium.

In another aspect, the crystalline substrate may comprise a precious stone and/or a semi-precious stone.

In yet another aspect, the crystalline substrate may be planar. In another aspect, it may be curved.

In a still further aspect, the substrate may be transparent.

In another aspect, two sides of the substrate may be provided with an optical multi-layer system.

In another aspect, the crystalline substrate may comprise one or more of a sheet, a watchglass, an instrument cover glass, a wafer, a crystalline detector and an optical filter. For example, it may comprise a sheet of sapphire, a watchglass of sapphire and/or a silicon wafer.

In yet another aspect of the substrate, the optical multi-layer system may comprise an interference layer system, for example, an antireflection layer system.

DETAILED DESCRIPTION OF THE INVENTION

It is an object of the invention to provide optical multi-layer systems on crystalline substrates.

This object is achieved in accordance with the invention by an optical multi-layer system on a crystalline substrate, comprising the following stages:
a) applying a free-flowing composition comprising nanoscale inorganic solid particles having polymerizable and/or polycondensable organic groups to a crystalline substrate;
b) polymerizing and/or polycondensing the groups of the solid particles to form an organically crosslinked layer;
c) applying a further composition according to a), which gives rise to a different refractive index than the preceding composition, to the organically crosslinked layer;
d) polymerizing and/or polycondensing the groups of the solid particles to form a further organically crosslinked layer;
e) optional single or multiple repetition of steps c) and d) to form further organically crosslinked layers on the organically crosslinked layers already present and/or other surfaces of the substrate; and
f) single-stage thermal consolidation of the layer composite and burnout of the organic constituents present;
for the layer applied last,
1) optionally, the polymerization and/or polycondensation of the groups of the solid particles to form an organically crosslinked layer can also be effected directly in the final stage f) or
2) optionally and alternatively, the nanoscale inorganic solid particles have no polymerizable and/or polycondensable organic groups, so that, in this case, for the uppermost layer, no polymerization and/or polycondensation of groups of the solid particles with formation of organic crosslinking takes place before or in step f).

FIG. 1 depicts the transmission behavior of a crystalline substrate which, in accordance with the example below, is provided with an optical multi-layer system in accordance with the invention (curve 2), and that of the uncoated substrate (curve 1).

It is possible by virtue of the invention to apply optical multilayer systems to crystalline, nonmetallic, inorganic substrates. The resulting multi-layer systems feature a high scratch resistance. The crystalline substrate may, for example, be single crystals or polycrystalline materials. It is possible to use any known crystalline material which is suitable for the particular purpose. Examples of preferred crystalline substrates are substrates of silicon, lithium niobate, lithium tantalate, quartz, sapphire, other precious stones or semi-precious stones and other optical crystals, crystalline detectors, for example for electromagnetic radiation, such as PbS or selenium, and optical filters (UV, IR, NIR and VIS), particular preference being given to sapphire among the crystalline substrates. The crystalline substrate is preferably a transparent substrate. The substrate may also be present, for example, as a surface layer on a support of another material.

The substrate may have any desired shape. It may, for example, be planar or curved, for example concave or convex. The substrate may be provided with an optical multi-layer system on one side or on both sides. The substrate may be present, for example, in the form of a rectangular or round sheet or of a lens or of any other shape. In a preferred embodiment, the substrate is a wafer, a screen, an instrument cover glass, a crystalline detector, an optical filter or especially a watchglass of a crystalline material. In some fields of use, the term "glasses" is customary in commerce or in industry for some embodiments of crystalline substrates, for example when it is also possible to use true glasses for the application.

Particularly preferred specific embodiments of the substrates are silicon wafers, sapphire sheets, as can be used, for example, at laser scanner cashdesks, instrument cover glasses of sapphire and especially sapphire watchglasses.

The optical multi-layer systems are suitable generally as interference multi-layer systems, for example as reflection or antireflection coatings, antireflection coatings being a preferred application. Further appropriate applications are NIR reflection filters, edge filters and bandpass filters. Further applications are listed below.

The process for producing the optical multi-layer systems on crystalline substrates will be illustrated in detail below.

Use of nanoscale particles which are coated with polymerizable and/or polycondensable groups provides the possibility of producing chemically stable layers even at very low temperatures, for example by means of photopolymerization, and in this way of applying further layers by the same process. In this context, it has been found that, surprisingly, these layers can be consolidated on crystalline substrates without crack formation, even in the case of layer systems having up to 10 or more individual layers, and that their optical action can be calculated in advance exactly. This is evident from the content of inorganic components of the particular coating system, the amount applied (layer thickness) and the refractive index attained after the thermal end consolidation.

In the present description and the appendant claims, "nanoscale inorganic solid particles" are understood to mean those having a mean particle size (a mean particle diameter) of not more than 200 nm, preferably not more than 100 nm, and in particular not more than 70 nm. A particularly preferred particle size range is from 5 to 50 nm.

The mean particle size is understood here to mean the mean particle diameter based on the volume average, and a UPA (Ultrafine Particle Analyzer, Leeds Northrup (laser optics, dynamic laser light scattering)) can be used for the measurement. To determine very small particles (for example less than 3.5 nm), it is also possible to use electron microscopy methods (for example by means of HR-TEM).

The nanoscale inorganic solid particles may consist of any materials, but they preferably consist of metals or semimetals and in particular of semimetal or metal compounds, for example (optionally hydrated) oxides such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$; chalcogenides, for example sulfides (e.g. CdS, ZnS, PbS and $Ag_2S$), selenides (e.g. GaSe, CdSe and ZnSe) and tellurides (e.g. ZnTe or CdTe), halides such as AgCl, AgBr, AgI, CuCl, CuBr, $CdI_2$ and $PbI_2$; carbides such as $CdC_2$ or SiC; arsenides, such as AlAs, GaAs and GeAs; antimonides such InSb; nitrides such as BN, AlN, $Si_3N_4$ and $Ti_3N_4$; phosphides such as GaP, InP, $Zn_3P_2$ and $Cd_3P_2$; phosphates, silicates, zirconates, aluminates, stannates and the corresponding mixed oxides (for example those with perovskite structure such as $BaTiO_3$ and $PbTiO_3$).

The nanoscale inorganic solid particles used in the process according to the invention are preferably those of oxides, sulfides, selenides and tellurides of metals and mixtures thereof. Particular preference is given in accordance with the invention to nanoscale particles of $SiO_2$, $TiO_2$, $ZrO_2$, ZnO, $Ta_2O_5$, $SnO_2$ and $Al_2O_3$ (in all modifications, especially as boehmite, AlO(OH)) and mixtures thereof.

Since the nanoscale particles usable in accordance with the invention cover a wide range of refractive indices, suitable selection of these nanoscale particles allows the refractive index of the layer(s) to be adjusted to the desired value in a convenient manner.

The nanoscale solid particles used in accordance with the invention can be prepared in a customary manner, for example by flame pyrolysis, plasma processes, gas-phase condensation processes, colloid techniques, precipitation processes, sol-gel processes, controlled nucleation and growth processes, MOCVD processes and (micro)emulsion processes. These processes are described comprehensively in the literature. In particular, it is possible to employ, for example, semimetals or metals (for example after the reduction of the precipitation process), ceramic oxidic systems (by precipitation from solution), but also salt-like or multi-component systems. The salt-like or multi-component systems also include semiconductor systems. The nanoscale solid particles are preferably prepared by means of the sol-gel process.

The nanoscale inorganic solid particles which have been provided with polymerizable and/or polycondensable organic groups and are used in accordance with the invention can in principle be prepared in two ways, firstly by surface modification of already prepared nanoscale inorganic solid particles and secondly by preparing these inorganic nanoscale solid particles using one or more compounds which possess such polymerizable and/or polycondensable groups. These two routes are described below and illustrated in detail in the examples.

The organic polymerizable and/or polycondensable groups may be any groups which are known to the person skilled in the art and are amenable to free-radical, cationic or anionic, thermal or photochemical polymerization, or to thermal or photochemical polycondensation (optionally in the presence of a suitable initiator or catalyst). Preference is given in accordance with the invention to surface groups which possess a (meth)acryloyl, allyl, vinyl or epoxy group, particular preference being given to (meth)acryloyl and epoxy groups. For the polycondensable groups, mention should be made in particular of hydroxyl, carboxyl and amino groups, with whose aid ether, ester and amide bonds between the nanoscale particles can be obtained.

It is also preferred in accordance with the invention that the organic moieties which comprise the polymerizable and/or polycondensable groups and are present on the surfaces of the nanoscale particles have a relatively low molecular weight. In particular, the molecular weight of the (purely organic) moieties should not exceed 500 and preferably 300, more preferably 200. This of course does not rule out a significantly higher molecular weight of the compounds (molecules) comprising these moieties (for example not more than 2000 or not more than 1000).

As already mentioned above, the polymerizable/polycondensable groups can in principle be provided in two ways. When a surface modification of already prepared nanoscale particles is carried out, suitable compounds for this purpose are all (preferably low molecular weight) compounds which firstly possess one or more groups which can react or at least interact with functional groups (for example OH groups in the case of oxides) present on the surface of the nanoscale solid particles, and secondly have at least one polymerizable/polycondensable group. The corresponding compounds can thus form, for example, both covalent and ionic (salt-like) or coordinate (complex) bonds to the surface of the nanoscale solid particles, while the pure interactions include, by way of example, dipole-dipole interactions, hydrogen bonds and van der Waals interactions. Preference is given to the formation of covalent and/or coordinate bonds. Specific examples of organic compounds employable for the surface modification of the nanoscale inorganic solid particles are, for example, unsaturated carboxylic acids such as acrylic acid and methacrylic acid, β-dicarbonyl compounds (e.g. β-diketones or β-carbonylcarboxylic acids) having polymerizable double bonds, ethylenically unsaturated alcohols and amines, amino acids, epoxides and the like. Such compounds which are particularly preferred in accordance with the invention are—especially in the case of oxidic particles—hydrolytically condensable silanes having at least (and preferably) one non-hydrolyzable radical which possesses an polymerizable carbon-carbon double bond or an epoxide ring. Such silanes preferably have the general formula (I):

$$X\text{---}R^1\text{---}SiR^2_3 \qquad (I)$$

in which X is $CH_2=CR^3$—COO, $CH_2=CH$ or glycidyloxy, $R^3$ is hydrogen or methyl, $R^1$ is a divalent hydrocarbon radical which has from 1 to 10, preferably from 1 to 6 carbon atoms and optionally contains one or more heteroatom moieties (e.g. O, S, NH) which separate adjacent carbon atoms from one another, and the $R^2$ radicals, identically or differently from one another, are selected from alkoxy, aryloxy, acyloxy and alkylcarbonyl groups, and also halogen atoms (especially F, Cl and/or Br).

The $R^2$ groups are preferably identical and are selected from halogen atoms, $C_{1-4}$-alkoxy groups (e.g. methoxy, ethoxy, n-propoxy, i-propoxy and butoxy), $C_{6-10}$-aryloxy groups (e.g. phenoxy), $C_{1-4}$-acyloxy groups (e.g. acetoxy and propionyloxy) and $C_{2-10}$-alkylcarbonyl groups (e.g. acetyl). Particularly preferred $R^2$ radicals are $C_{1-4}$-alkoxy groups and especially methoxy and ethoxy.

The $R^1$ radical is preferably an alkylene group, in particular one having from 1 to 6 carbon atoms, for example ethylene, propylene, butylene and hexylene. When X is $CH_2=CH$, $R^1$ is preferably methylene and can in this case also be a simple bond.

X is preferably $CH_2=CR^3$—COO (where $R^3$ is preferably $CH_3$) or glycidyloxy. Accordingly, particularly preferred silanes of the general formula (I) are (meth)acryloyloxyalkyltrialkoxysilanes, for example 3-methacryloyloxypropyltri(m)ethoxysilane, and glycidyloxyalkyltrialkoxysilanes, for example 3-glycidyloxypropyltri(m)ethoxysilane.

When nanoscale inorganic solid particles are prepared using one or more compounds which possess polymerizable/polycondensable groups, it is possible to dispense with a subsequent surface modification (although this is of course possible as an additional measure).

The in situ preparation of nanoscale inorganic solid particles with polymerizable/polycondensable surface groups will be illustrated below using the example of SiO$_2$ particles. For this purpose, the SiO$_2$ particles can be prepared, for example, by the sol-gel process using at least one hydrolytically polycondensable silane having at least one polymerizable/polycondensable group. Suitable silanes of this type are, for example, the silanes of the general formula (I) already described above. These silanes are preferably used either alone or in combination with a suitable silane of the general formula (II)

$$SiR^2{}_4 \quad (II)$$

where R$^2$ is as defined above. Preferred silanes of the above general formula (II) are tetramethoxysilane and tetraethoxysilane.

It is of course also possible, additionally or alternatively to the silanes of the general formula (II), to use other silanes, for example those which possess an (non-hydrolyzable) hydrocarbon group without any functional group, for example methyl- or phenyltrialkoxysilanes.

The composition used in the process according to the invention is present in the form of a still free-flowing mass (suspension). The liquid constituent of this mass is composed, for example, of water and/or (preferably water-miscible) organic solvents and/or compounds which have been used or obtained in the course of preparation of the nanoscale particles or their surface modification (for example alcohols in the case of alkoxysilanes). Suitable organic solvents optionally used additionally are, for example, alcohols, ethers, ketones, esters, amines and the like. An (additional) constituent of the free-flowing mass may, for example, also be at least one monomeric or oligomeric species which possesses at least one group which can react (polymerize or polycondense) with polymerizable/polycondensable groups present on the surface of the nanoscale particles. Such species include, for example, monomers having an polymerizable double bond, for example acrylic esters, methacrylic esters, styrene, vinyl acetate and vinyl chloride. Preferred monomeric compounds having more than one polymerizable bond are in particular those of the general formula (III):

$$(CH_2{=}CR^3{-}COZ{-})_n\text{-}A \quad (III)$$

where
n=2, 3 or 4, preferably 2 or 3 and in particular 2;
Z=O or NH, preferably O;
R$^3$=H, CH$_3$;
A=n-valent hydrocarbon radical which has from 2 to 30, especially from 2 to 20 carbon atoms and may have one or more heteroatom moieties, each of which is disposed between two adjacent carbon atoms (examples of such heteroatom moieties are O, S, NH, NR (R=hydrocarbon radical), preferably O).

A hydrocarbon radical A may also bear one or more substituents which are preferably selected from halogen (especially F, Cl and/or Br), alkoxy (especially C$_{1\text{-}4}$-alkoxy), hydroxyl, optionally substituted amino, NO$_2$, OCOR$^5$, COR$^5$ (R$^5$=C$_{1\text{-}6}$-alkyl or phenyl). However, the A radical is preferably unsubstituted or halogen- and/or hydroxyl-substituted.

In one embodiment of the present invention, A is derived from an aliphatic diol, an alkylene glycol, a polyalkylene glycol or an optionally alkoxylated (e.g. ethoxylated) bisphenol (e.g. bisphenol A).

Further usable compounds having more than one double bond are, for example, allyl(meth)acrylate, divinylbenzene and diallyl phthalate. It is equally possible, for example, to use a compound having 2 or more epoxy groups (in the case of use of epoxy-containing surface groups), for example bisphenol A diglycidyl ether or else an (oligomeric) precondensate of an epoxy-containing hydrolyzable silane (e.g. glycidyloxypropyltrimethoxysilane).

The content of organic components in the coating compositions used in accordance with the invention is preferably not more than 20% by weight based on the solids content. It may, for example, be 5% by weight for layers with high refractive index, or, for example, 15% by weight for layers with low refractive index.

The coating composition used in accordance with the invention preferably has a pH of ≧3, more preferably ≧4. In general, the pH is within the neutral range up to about 8, preferably up to about 7.5.

In stage a) of the process according to the invention, the coating composition is applied to the crystalline substrate, in order to fully or partly coat it. The coating processes suitable for this purpose are the conventional processes and those known to the person skilled in the art.

Examples thereof are dipping, spraying, knife-coating, spreading, brushing or spin-coating.

Before the application to the crystalline substrate, the free-flowing mass may be adjusted to a suitable viscosity, for example by adding solvents or evaporating volatile constituents (especially solvent already present). Before the application of the free-flowing mass, the substrate may optionally be subjected to a pretreatment (for example cleaning, degreasing, etc.).

In stage b) of the process according to the invention, an polymerization and/or polycondensation of the polymerizable/polycondensable surface groups of the nanoscale inorganic solid particles (and, if appropriate, of the polymerizable/polycondensable groups of the monomeric or oligomeric species used additionally) is carried out. This polymerization/polycondensation can be carried out in a manner familiar to the person skilled in the art. Examples of suitable processes are thermal, photochemical (for example with UV radiation), electron beam curing, laser curing, room temperature curing, etc. Such an polymerization/polycondensation is optionally effected in the presence of a suitable catalyst or starter (initiator) which is added to the free-flowing mass no later than immediately before it is applied to the substrate.

Useful initiators/initiator systems include all starters/starter systems familiar and known to the person skilled in the art, including free-radical photoinitiators, free-radical thermal initiators, cationic photoinitiators, cationic thermal initiators and any combinations thereof.

Specific examples of usable free-radical photoinitiators are Irgacure® 184 (1-hydroxycyclohexyl phenyl ketone), Irgacure® 500 (1-hydroxycyclohexyl phenyl ketone, benzophenone) and other Irgacure® photoinitiators obtainable from Ciba-Geigy; Darocur® 1173, 1116, 1398, 1174 and 1020 (obtainable from Merck); benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone.

Examples of free-radical thermal initiators include organic peroxides in the form of diacyl peroxides, peroxydicarbonates, alkyl peresters, alkyl peroxides, perketals, ketone peroxides and alkyl hydroperoxides, and also azo compounds. Specific examples include in particular dibenzoyl peroxide, tert-butyl perbenzoate and azobisisobutyronitrile. One example of a cationic photoinitiator is Cyracure® UVI-6974, while a preferred cationic thermoinitiator is 1-methylimidazole.

These initiators are used in the customary amounts known to those skilled in the art (preferably 0.01-5% by weight, in particular 0.1-2% by weight, based on the total solids content of the coating composition. Of course, it is possible under some circumstances to dispense entirely with the initiator, for example in the case of electron beam or laser curing.

The polymerization/polycondensation of stage b) of the process according to the invention is effected preferably thermally or by irradiation (especially with UV light). Particular preference is given to a photochemical polymerization/polycondensation or to a combination of thermal and photochemical polymerization/polycondensation.

The polymerization/polycondensation can be preceded by the removal of further volatile, non-polymerizable/non-polycondensable compounds from the layer applied to the substrate. This removal of volatile constituents can also or additionally be effected at the stage of the polymerization/polycondensation or thereafter.

A typical process according to the invention will be outlined by way of example below, the ranges and procedures specified being generally valid irrespective of the specifically used materials.

Nanoscale particles of, for example, $SiO_2$, $TiO_2$, $ZrO_2$ or other oxidic or sulfidic materials (particle size from 30 to 100 nm, preferably from 40 to 70 nm) are dispersed in a solvent (for example in a lower alcohol such as methanol, ethanol, propanol) in a concentration of from 1 to 20% by weight, preferably from 5 to 15% by weight, and admixed with a surface modifier having polymerizable/polycondensable groups in an amount of preferably from 2 to 25% by weight, in particular from 4 to 15% by weight (based on the total solids content). In the case of use of, for example, silanes, the surface modification can be carried out by stirring at room temperature for several hours. Another monomeric or oligomeric material which has polymerizable/polycondensable groups and is compatible with the surface modifier or the surface groups can then optionally be added in an amount of, for example, up to 20% by weight, preferably from 4 to 15% by weight (based on the total solids content).

After adjusting the viscosity by adding or removing solvents, one or more suitable initiators (in each case in an amount of, for example, from 0.01 to 5% by weight, based on the total solids content) and optionally other customary additives are added.

The coating composition is then applied to the substrate, the amount applied depending upon the desired refractive index and the field of use generally so as to obtain layer thicknesses in the range from 50 to 200 nm, preferably from 100 to 150 nm.

The subsequent polymerization/polycondensation (crosslinking) is effected at relatively low temperature, preferably in the temperature range from 10 to 50° C., in particular from 10 to 30° C., and more preferably at room temperature. In another embodiment, for instance in the case of thermal crosslinking, the organically crosslinked layer(s) is/are formed preferably at temperatures of 150° C. or less and more preferably 130° C. or less.

When a reduction in the reaction times is desired, preference is given to using photopolymerization; it is possible here to employ any light sources, especially UV light-emitting sources (for example mercury vapor lamps, xenon lamps, laser light).

In the manner described, one or more further layers are applied to the organically crosslinked layer formed until the desired layer composite is obtained. In the case of the last (outermost) layer, no separate crosslinking stage is required, and this can instead be effected directly in the final consolidation and burnout stage f).

For the last or outermost layer, it is optionally possible to apply, instead of a free-flowing composition which comprises nanoscale inorganic solid particles having polymerizable and/or polycondensable organic groups and gives rise to a different refractive index than the preceding composition, a free-flowing composition which gives rise to a different refractive index than the preceding composition and comprises the nanoscale inorganic solid particles without polymerizable and/or polycondensable organic groups. In this case, there is naturally also no organic crosslinking in the outermost layer before or in step f).

It has been found that the organic crosslinking is required so that further layers can be applied without damage to layers in which no consolidation and burnout of the organic constituents present has yet been effected. Since no further layer is applied for the last or outermost layer, the organic crosslinking is also not required, so that, as mentioned above, the nanoscale inorganic solid particles in the composition for the outermost layer need not have any polymerizable and/or polycondensable organic groups. Of course, it is also just as possible for the last layer to use free-flowing compositions which comprise nanoscale inorganic solid particles having polymerizable and/or polycondensable organic groups.

For example, in the case of a multilayer system composed of two layers, the second layer, instead of by applying a free-flowing composition which comprises nanoscale inorganic solid particles having polymerizable and/or polycondensable groups, can alternatively be formed by applying a free-flowing composition which comprises nanoscale inorganic solid particles without polymerizable and/or polycondensable groups. The resulting layer composite is then treated further in accordance with step f) explained below.

For the optional composition for the outermost sol-gel layer which comprises nanoscale inorganic solid particles without polymerizable and/or polycondensable groups, apart from the absence of the polymerizable and/or polycondensable groups, exactly the same applies as for the compositions already described. In particular, all above statements for the nanoscale inorganic solid particles apply, for example with regard to material, size, preparation, etc. The nanoscale inorganic solid particles may be unmodified; but they may also be surface-modified. For surface-modified nanoscale inorganic solid particles, exactly the same applies for the surface modification as explained above, except that the groups applied to the surface comprise no polymerizable and/or polycondensable groups.

Further examples of compounds which can be used for a surface modification without polymerizable and/or polycondensable groups are optionally substituted carboxylic acids which have from 1 to 24 carbon atoms and may also contain ether bonds, and also their anhydrides, esters (preferably $C_1$-$C_4$-alkyl esters) and amides, quaternary ammonium salts of the formula $NR^6R^7R^8R^{9+}X^-$, where $R^6$ to $R^9$ are aliphatic, aromatic or cycloaliphatic groups which are optionally different from one another and have preferably from 1 to 12, in particular from 1 to 8 carbon atoms, for example alkyl groups having from 1 to 12, in particular from 1 to 8 and more preferably from 1 to 6 carbon atoms (e.g. methyl, ethyl, n- and i-propyl, butyl or hexyl), and X⁻ is an inorganic or organic anion, for example acetate, OH⁻, Cl⁻, BR⁻ or I⁻; mono- and polyamines, especially those of the general formula $R_{3-n}NH_n$ where n=0, 1 or 2 and the R radicals are each independently alkyl groups having from 1 to 12, in particular from 1 to 8 and more preferably from 1 to 6 carbon atoms (e.g. methyl, ethyl, n- and i-propyl, butyl or hexyl) and ethylenepolyamines (e.g. ethylenediamine, diethylenetriamine, etc.); amino acids; imines; β-dicarbonyl compounds having from 4 to 12, in particular from 5 to 8 carbon atoms, for example acetylacetone, 2,4-hexanedione, 3,5-heptanedione, acetoacetic acid and $C_{1-4}$-alkyl acetoacetates such as ethyl acetoacetate; and silanes.

Hydrolyzable silanes suitable for modification are, for example, silanes of the general formula:

$$Rt_n SiR^2_{(4-n)} \quad (IV)$$

where the $R^2$ radicals are the same or different and are each hydrolyzable groups or hydroxyl groups and are as defined in formula (I), the Rt radicals are the same or different and are each non-hydrolyzable groups and n is 1, 2 or 3, or an oligomer derived therefrom.

The non-hydrolyzable Rt radical without functional group, is for example, alkyl (preferably $C_{1-24}$-alkyl such as methyl, ethyl, n-propyl, isopropyl, n-butyl, sec-butyl and tert-butyl, pentyl, hexyl, octyl or cycohexyl), alkenyl (preferably $C_{2-24}$-alkenyl, for example vinyl, 1-propenyl, 2-propenyl and butenyl), alkynyl (preferably $C_{2-24}$-alkynyl, for example acetylenyl and propargyl), aryl (preferably $C_{6-10}$-aryl, for example phenyl and naphthyl) and also alkylaryls and arylalkyls derived therefrom. The R and X radicals may optionally have one or more customary substituents, for example halogen or alkoxy.

In stage f), the layer composite is heated to temperatures of from 400 to 800° C., preferably from 400 to 600° C. and in particular from 400 to 500° C., and kept at this temperature, for example, for from 1 minute to 1 hour. In the course of this, full burnout of the organic (carbon-containing) constituents is effected, without there being crack formation or other defects.

For this purpose, it is preferred to perform the consolidation and burnout in step f) such that heating of the layer composite is effected from the outside inward in the direction toward the crystalline substrate. This enables the organic constituents present in the interior of the composite to be able to escape through the already heated outer layers. For the same reason, the layers are preferably heated with a heating rate of at least 100° K/min.

The optical multi-layer systems produced in accordance with the invention are, for example, as interference systems such as reflection and antireflection coatings, also suitable, in addition to the applications explained above, for the following applications:

Optical filters: antireflection and reflection filters in the field of the spectacles industry, displays, visual display units, semiconductor lasers, microlens coating, solar cells, "damage-resistant" laser layers, bandpass filters, antireflection filters, absorption filters and beam dividers.

Holographic layers: light guide systems, information storage, laser couplers, waveguides, decoration and architecture.

Embossable layers: antireflection systems, focusing in detector fields, illumination of flat visual display units, imaging in photocopiers, fiber optics (light injection).

Lithography: production of microoptical elements such as waveguides, grids, pinholes, diffraction gratings (point gratings), and in the field of display technology, fiber-chip coupling and imaging optics.

The example which follows serves to further illustrate the invention without limiting it.

EXAMPLE

AR Coating on Sapphire Watchglass

A. Sol Synthesis
1. Base Sols
1.1. $TiO_2$ Base Sol 28.43 g (0.1 mol) of tetraisopropyl orthotitanate are dissolved in 205.83 g of isopropanol, and 10.00 g (0.1 mol) of acetylacetone are added with stirring. After stirring at room temperature for 15 min, a solution of 6.65 g of concentrated hydrochloric acid (HCl, 37%) in 2.78 g of water is added with stirring. The mixture is stirred at room temperature for 24 h.

1.2. GPTS Hydrolyzate

A one-neck flask equipped with reflux condenser, magnetic stirrer and oil bath is charged with 23.63 g (0.1 mol) of 3-glycidyloxypropyltrimethoxysilane (GPTS) and 2.70 g of hydrochloric acid (0.1 N) which are stirred at 40° C. for 24 h. The reaction mixture is concentrated on a rotary evaporator (45° C., 50 mbar, 1 h) to result in a clear, colorless, slightly viscous liquid.

1.3. TEOS Hydrolyzate 20.83 g (0.1 mol) of tetraethoxysilane (TEOS) are admixed with 15.28 g of water, and 0.29 g of concentrated hydrochloric acid (HCl, 37%) is added with stirring. After the reaction mixture has clarified (after approx. 5 min), 26.90 g of ethanol are added and the mixture is stirred at room temperature for a further 2 h.

2. Coating Sols
2.1. H Sol

To prepare 100 g of H sol, 63.66 g of the $TiO_2$ base sol are dissolved in 26.37 g of isopropanol and 6.59 g of 1-butanol, 0.07 g of the GPTS hydrolyzate and 3.31 g of the TEOS hydrolyzate are added with stirring, and the mixture is stirred at room temperature for 5 min.

2.2. L Sol

To prepare 100 g of L sol, 6.41 g of the $TiO_2$ base sol are dissolved in 52.19 g of isopropanol and 13.05 g of 1-butanol, 28.34 g of the TEOS hydrolyzate are added with stirring and the mixture is stirred at room temperature for 5 min.

B. Production of the Multi-Layer System on Sapphire Substrates

The sols are applied to a sapphire watchglass by means of spin-coating technology. The substrates are cleaned with ethanol. 2 AR layers (H and L sol) are applied to each side of the sapphire watchglass (2000-2500 rpm). After each coating, the substrates are predried at 120° C., 1-2 minutes. The complete coating is followed by the stack cure at 450° C. for 30 min.

C. Results

The transmission measurement (CARY 5E spectrophotometer, Varian, Australia pty, Ltd.) shows that the transmission of the sapphire watchglass coated in two stages in accordance with the invention (curve 2) is significantly improved compared to the uncoated substrate (curve 1) over the entire visible spectral region and that it is actually better than 99% in the 510-570 nm range (FIG. 1).

What is claimed is:

1. A crystalline substrate comprising an optical multi-layer system thereon, which substrate is obtainable by
   (a) applying a first free-flowing composition which comprises nanoscale inorganic solid particles comprising at least one of a polymerizable and a polycondensable organic group to at least one surface of a crystalline substrate;
   (b) at least one of polymerizing and polycondensing the organic groups of the solid particles to form a first organically crosslinked layer on the at least one surface;
   (c) applying a second free-flowing composition which comprises nanoscale inorganic solid particles comprising at least one of a polymerizable and a polycondensable organic group to the organically crosslinked layer of (b), the second composition giving rise to a different refractive index than the first composition;
   (d) at least one of polymerizing and polycondensing the organic groups of the solid particles of the applied second composition to form a second organically crosslinked layer on the first organically crosslinked layer;
   (e) optionally, applying a further free-flowing composition which comprises nanoscale inorganic solid particles comprising at least one of a polymerizable and a polycondensable organic group to the organically crosslinked layer of (d) and at least one of polymerizing and polycondensing the organic groups of the solid particles of the further composition to form a further organically crosslinked layer on the second organically crosslinked layer;
   (f) optionally, repeating (e) one or more times to form one or more further organically crosslinked layers; and
   (g) single-stage thermal consolidation of the organically crosslinked layers present and burnout of organic constituents thereof;
with the proviso that for the uppermost layer the nanoscale inorganic solid particles do not comprise a polymerizable or polycondensable organic group so that for the uppermost layer a polymerization or polycondensation of groups of the solid particles with formation of organic crosslinking does not take place before or during (g).

2. The substrate of claim 1, wherein the crystalline substrate comprises one or more of silicon, lithium niobate, lithium tantalate, quartz, sapphire, PbS and selenium.

3. The substrate of claim 1, wherein the crystalline substrate comprises silicon.

4. The substrate of claim 1, wherein the crystalline substrate comprises one or more of PbS and selenium.

5. The substrate of claim 1, wherein the crystalline substrate comprises at least one of a precious stone and a semiprecious stone.

6. The substrate of claim 1, wherein the crystalline substrate is planar.

7. The substrate of claim 1, wherein the crystalline substrate is curved.

8. The substrate of claim 1, wherein the substrate is transparent.

9. The substrate of claim 1, wherein two sides of the substrate are provided with an optical multi-layer system.

10. The substrate of claim 1, wherein the crystalline substrate comprises one or more of a sheet, a watchglass, an instrument cover glass, a wafer, a crystalline detector and an optical filter.

11. The substrate of claim 10, wherein the crystalline substrate comprises at least one of a sheet of sapphire, a watchglass of sapphire and a silicon wafer.

12. The substrate of claim 10, wherein the crystalline substrate comprises a watchglass of sapphire.

13. The substrate of claim 10, wherein the crystalline substrate comprises a silicon wafer.

14. The substrate of claim 1, wherein the nanoscale particles comprise one or more compounds selected from $SiO_2$, $TiO_2$, $ZrO_2$, $ZnO$, $Ta_2O_5$, $SnO_2$ and $Al_2O_3$ and the polymerizable or polycondensable organic groups comprise organic radicals which comprise at least one of a (meth)acryloyl group, a vinyl group, an allyl group and an epoxy group.

15. The substrate of claim 1, wherein the optical multi-layer system comprises an interference layer system.

16. The substrate of claim 15, wherein the optical multi-layer system comprises an antireflection layer system.

17. The substrate of claim 1, wherein one or more organically crosslinked layers are formed at a temperature of up to about 130° C.

18. The substrate of claim 1, wherein (g) is carried out at a temperature of at least 400° C.

19. The substrate of claim 18, wherein (g) is carried out at a heating rate of at least 100° K/min.

20. The substrate of claim 18, wherein in (g) heating at a temperature of from 400° C. to 800° C. is carried out for a period of from 1 minute to 1 hour.

21. The substrate of claim 18, wherein the crystalline substrate comprises silicon.

22. The substrate of claim 21, wherein the crystalline substrate comprises a silicon wafer.

23. The substrate of claim 18, wherein the crystalline substrate comprises lithium niobate.

24. The substrate of claim 18, wherein the crystalline substrate comprises lithium tantalate.

25. The substrate of claim 18, wherein the crystalline substrate comprises quartz.

26. The substrate of claim 18, wherein the crystalline substrate comprises sapphire.

27. The substrate of claim 18, wherein the crystalline substrate comprises PbS.

28. The substrate of claim 18, wherein the crystalline substrate comprises selenium.

29. The substrate of claim 26, wherein the crystalline substrate comprises a sheet of sapphire.

30. The substrate of claim 26, wherein the crystalline substrate comprises a watchglass of sapphire.

* * * * *